Figure 1:
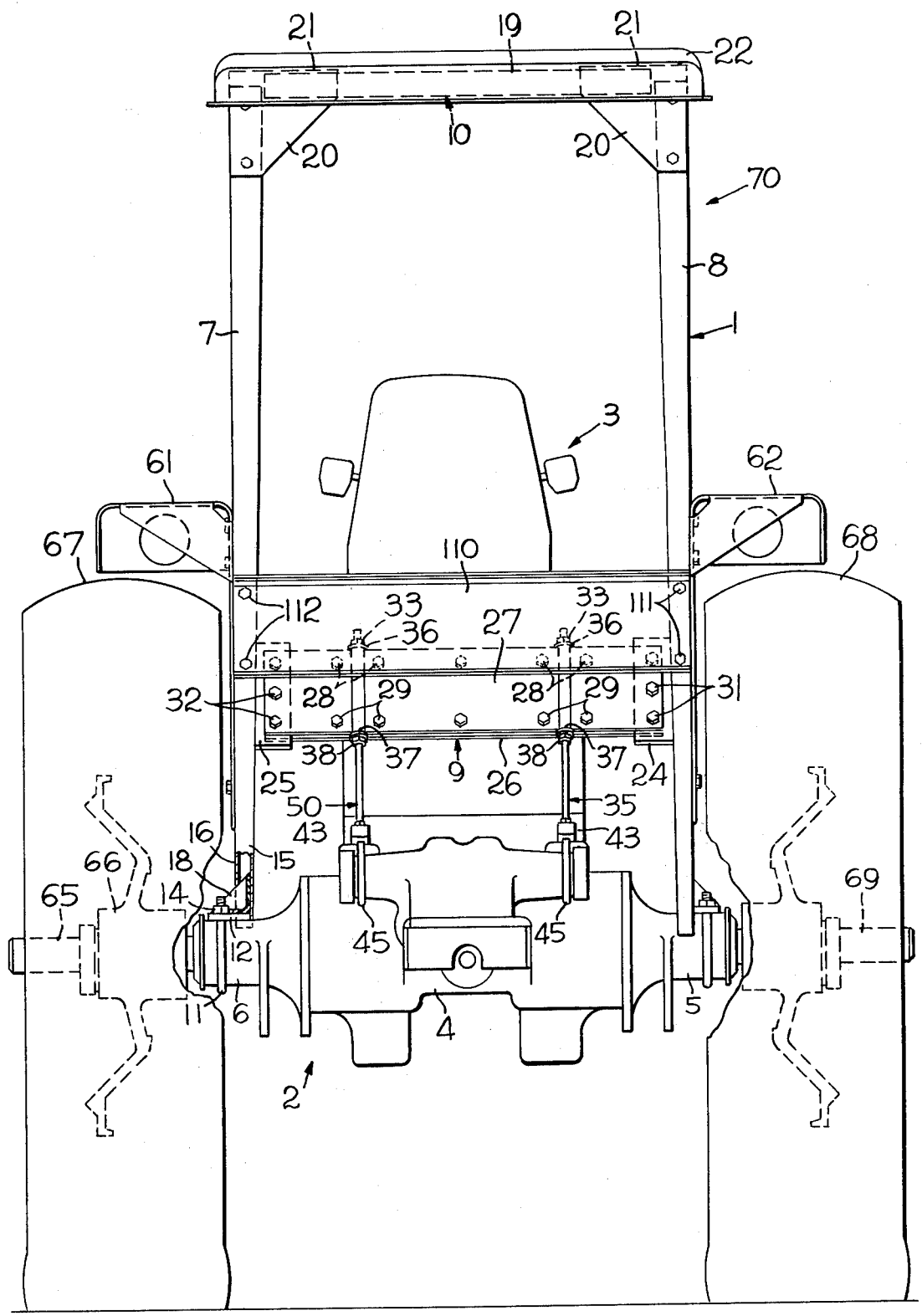

United States Patent

Atherton

[11] 4,049,294
[45] Sept. 20, 1977

[54] NARROW BASE PROTECTIVE FRAME

[75] Inventor: Ralph R. Atherton, Milwaukee, Wis.

[73] Assignee: Allis-Chalmers Corporation, Milwaukee, Wis.

[21] Appl. No.: 643,318

[22] Filed: Dec. 22, 1975

[51] Int. Cl.² ............................................. B62D 25/06
[52] U.S. Cl. .................................. 280/756; 296/102
[58] Field of Search ................. 280/756; 296/102; 188/1 C; 180/DIG. 2

[56] References Cited

U.S. PATENT DOCUMENTS

| | | | |
|---|---|---|---|
| 2,546,453 | 3/1951 | Koenig | 180/DIG. 2 |
| 3,443,833 | 5/1969 | Miller et al. | 296/102 |
| 3,732,941 | 5/1973 | Davis et al. | 280/756 |
| 3,787,085 | 1/1974 | Bucher et al. | 296/102 X |
| 3,791,668 | 2/1974 | Adams | 280/756 |
| 3,985,386 | 10/1976 | Woods | 296/102 |

Primary Examiner—Joseph F. Peters, Jr.
Assistant Examiner—Michael J. Forman
Attorney, Agent, or Firm—Arthur L. Nelson

[57] ABSTRACT

A narrow base protective frame to allow greater axial adjustment of the rear drive wheels on a tractor to vary the tread width of the wheels. The protective frame provides protection for the operator in event of rollover of the vehicle and has reinforcing structure between upright columns mounted on the rear drive axles.

10 Claims, 2 Drawing Figures

NARROW BASE PROTECTIVE FRAME

This invention relates to a rollover protective frame and more particularly to a narrow base protective frame to allow greater tread width adjustment of the rear drive wheels in the rear drive axles of a tractor while maintaining the safety requirements for rollover protection of the operator in the event of tractor rollover.

Conventional rollover protective bars provide a measure of safety for the operator in event the vehicle rolls over. The conventional rollover protective bars are provided with a wide base for the protective bars for mounting them on the rear drive axle housing. While the wide base on the protective bars provides a sturdiness in the mounting of the bars on the tractor the increased width on the base of the protective bars limits the adjustment of tread width of the rear wheels on the rear drive axle. In order to have maximum tread width adjustment on the rear wheels, it becomes necessary to narrow the base for the mounting of the protective bars of the tractor. The safety requirements for the operator in event of rollover of the tractor must be maintained. Accordingly, the protective frame of this invention is mounted on the rear axle housings but the base supporting the upright columns are narrowed to allow greater axial adjustment of the rear wheels on the drive axles. The protective frame is constructed in a manner whereby increased strength is provided between the upright columns on the tractor to maintain sturdiness for protecting the operator with a minimum of axial width of the protective frame to allow maximum axial rear wheel adjustment on the tractor. The strength of the protective frame is not sacrificed although substantially greater range of tread widths are available to the operator for adjusting the rear wheels on the rear drive axles.

It is an object of this invention to provide a narrow base rollover protection frame to provide rollover protection for the operator in event of upset of the tractor.

It is another object of this invention to provide a narrow base protective frame mounted on the rear drive axle housings with reinforced structure intermediate the upright bars to maintain a sound frame which will withstand the shock of vehicle rollover.

It is a further object of this invention to provide a narrow base protective frame mounted on the rear axle housings with reinforcing structure intermediate the upright columns on the rear axle housings. The increased strength of the reinforcing structure intermediate the upright columns provides for required protection for the vehicle operator in event of tractor upset.

It is a further object of this invention to provide a narrow base protective frame mounted on rear axle housings having upright columns which taper to a smaller dimension fore and aft from the bottom of the column to the top of the column and which taper to a narrower width from the top of the column to the bottom of the column for increasing the range of tread width adjustment on the rear wheels of the tractor.

The objects of this invention are accomplished by providing a narrow base protective frame with upright columns extending from the rear axle housings to support a canopy. The support on the rear axle is through a column which tapers downwardly from the canopy to a narrow width at the base of the frame connected to a plate for mounting on the rear axle housing. Preferably a U-bolt is used to fasten the base plate to the rear axle housing. The upright columns taper to a smaller dimension fore and aft from the base plate to the canopy. A reinforcing structure is provided between the upright columns to form a box section by a crossbeam at the top of the upright columns and a crossbeam between the lower portion of the upright columns to prevent excessive damage in event of rollover to the tractor. The top crossbeam is also connected to a gusset to provide stiffness to the upper portion of the protective frame.

Referring to the drawings, the preferred embodiment of this invention is illustrated.

Figure 2:
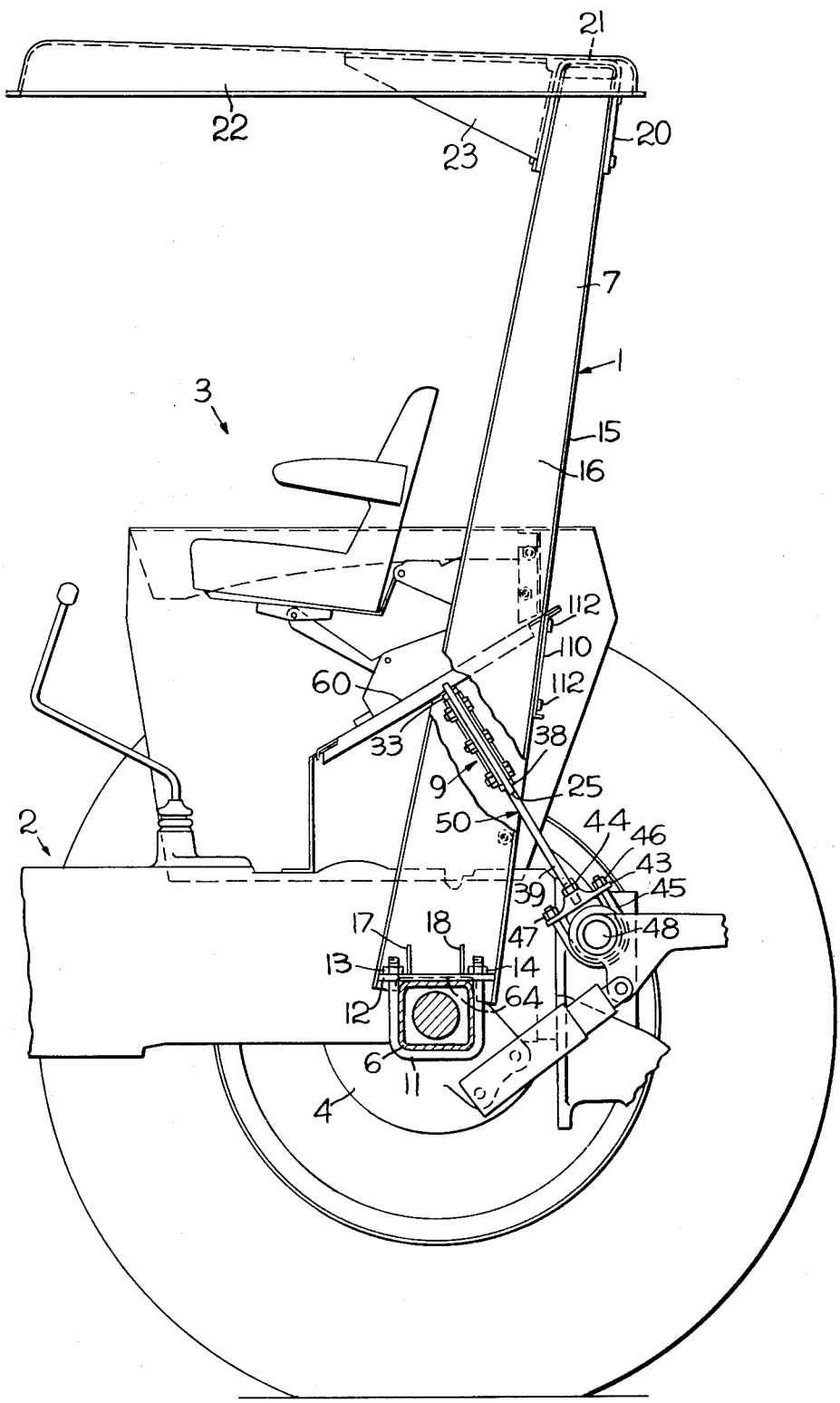

FIG. 1 illustrates a rear view of the protective frame mounted on a tractor; and FIG. 2 illustrates a side view of the protective frame and its mounting on the rear axle housing of a tractor.

Referring to the drawings, FIG. 1 illustrates the protective frame 1 mounted on the tractor 2 protecting the operator station 3. The rear drive assembly housing 4 is integral with the rear axle housing 5 and 6 which extend transversely from the rear drive assembly housing. The upright column 7 and the upright column 8 are connected at their lower portions by the cross-member 9. The upper cross-member 10 is connected to the upper ends of the upright columns 7 and 8.

FIG. 2 shows the mounting of the upright column 7 on the rear axle housing 6. The U-bolt 11 clamps around the underside of the rear axle housing 6 and is locked on the plate 12 by means of the nuts 13 and 14. The upright column 7 includes a channel 15 which is covered by a plate 16. The base plate 12 is fastened to the channel 15 by the gussets 17 and 18. The fender 61 is mounted on the upright column 7 while the fender 62 is mounted on the upright column 8 as shown in FIG. 1.

The upright column 7 extends upwardly and is connected to a cross-member 10 which includes a channel 19 and a gusset 20 which extends from the channel 19 and forms a horizontal surface 21 for mounting of the canopy 22. The gusset 23 extends forwardly from the upright column 7 to provide support of the cantilever mounting of the canopy 22.

The lower cross-member 9 is mounted on brackets 24 and 25. The cross-member 9 includes two plates, 26 and 27, which are bolted together by a plurality of bolts 28 and 29. The cross-member 9 is fastened to the brackets on the right-hand side by the plurality of bolts 31, and on the left-hand side by the plurality of bolts 32. A plurality of bolts may be positioned intermediate the bolts 28 and 29 to increase the resistance of the nut 33 as it is forced between the plates 26 and 27. Each of the struts 35 and 50 includes a nut 33 on its upper end and a mild steel washer 36 underneath the nut 33. Similarly a mild steel washer 37 is positioned underneath the nut 38. The bolt 39 of the strut 35 is free within the opening formed by the recesses 40 and 41 between which the bolt 39 extends. The strut 35 extends downwardly to form a base 43 which is locked by the lock nut 44 on the bolt 39. The U-bolt 45 and nuts 46 and 47 fasten the strut 35 on the rear drive assembly housing. The U-bolts fasten around the housing for the rock shaft 48 in the rear drive assembly housing of the vehicle chassis.

Seat support bracket 60 is supported by cross-plate 110 and also supported on the platform. Cross-plate 110 is bolted by bolts 112 to upright column 7 and bolted by bolts 111 to upright column 8 to provide strength to the protective frame 1.

It is noted that the upright columns 7 and 8 are tapered from the base to the top to form a lesser cross-sectional dimension fore and aft at the top than at the bottom. Likewise, the cross-sectional area at the bottom is narrower measured in a transverse direction than the top of the upright columns. The upright columns 7 and 8 are formed of blanks which are pressed into a channel and then a plate 16 is welded to close the channel. The blanks forming the upright columns 7 and 8 can be alternately cut from a rectangular blank. The rectangular blank will form two channels with right angle corners on the blank. The cutting of the opening to receive the rear axle housing 6 provides for tilting of the upright columns 7 and 8 when fabricated to the mounting plate 12. The rear axle 65 is coupled to hub 66 of wheel 67 to allow axial adjustment of the wheel 67. Wheel 68 is provided with a similar adjustable coupling for connection to the right rear axle.

The protective frame 1 is mounted on the rear drive axle housings 5 and 6. The base of the protective frame is mounted adjacent the rear drive assembly housing 4. The upright columns 7 and 8 are tapered from the top to the bottom transversely of the tractor to allow the close mounting to the rear drive assembly 4 so to not interfere with wheel adjustment for varying the tread width of the rear drive wheels 67 and 68. The rear drive wheels are mounted on a clamp style bushing which can be selectively loosened and slid axially in or out on the rear drive axle 65 and 69. By allowing the wheels to move axially inward a very narrow tread width can be provided on the tractor. Larger tractors tend to limit the narrow tread width which is necessary for some row crop field work, and accordingly this type of a narrow base frame will accommodate a narrower tread width than conventional tractors. The base of the frame is mounted on the rear drive axle housing while the frame per se forms a box section 70 which resists deforming in the event of upset of the vehicle. The base of the upright columns 7 and 8 have a narrower width than conventional upright columns but have a longer base dimension fore and aft and accordingly provide essentially the same strength at the base member and yet accommodate a closer mounting of the rear wheels and provide greater range of varying tread width for the tractor. 9n The embodiments of the invention in which an exclusive property or privilege is claimed are defined as follows:

1. A tractor having a narrow base protective frame comprising, a tractor including a rear drive assembly housing and a rear axle housing extending to each side of said rear drive assembly housing, a rear drive axle extending from each rear axle housing, a rear drive wheel mounted on each drive axle for adjustably moving axially to vary the tread widths of said drive wheels, means defining a tapered structure from the top to the bottom in a transverse direction for protecting an occupant, said means including a tapered upright column mounted on each of said rear axle housings, each of said upright columns being tapered with a narrower bottom than top as viewed in transverse cross-section, a base integral with said tapered upright column defining a width no wider than to accommodate bolting of the column and base to the rear axle housing, a crossbeam and reinforcing means connected between the upper ends of said tapered upright columns, a cross-member connecting the lower portion of said columns forming an integral structure with said columns, means integrally fastening said cross-member to each of said tapered columns and reinforcing said tapered upright columns across their width fore and aft and a portion of their length, with reinforcement of the protective frame around the operator station of the tractor for operator safety in the event of rollover of the tractor.

2. A tractor having a narrow base protective frame as set forth in claim 1 wherein said tapered upright columns taper from the bottom to the top wherein the dimension fore and aft in the cross section of said upright columns is smaller at the top than the bottom.

3. A tractor having a narrow base protective frame as set forth in claim 1 wherein said crossbeam on the top of said upright columns defines a U-shaped member, a canopy on the upright columns, a gusset connecting between the canopy and each of said upright columns for supporting said canopy.

4. A tractor having a narrow base protective frame as set forth in claim 1 including a second cross-member connected integrally to the lower portion of said upright columns including means for supporting a seat connected between said upright columns.

5. A tractor having a narrow base protective frame as set forth in claim 1 including means for connecting at least one strut to said cross-member and extending diagonally relative to said upright columns and connecting to said rear drive assembly housing for bracing said upright columns.

6. A tractor having a narrow base protective frame as set forth in claim 1 wherein said upright columns include a channel extending the length of said upright columns, a plate fabricated to said channel forming a closed column, means defining a recess in the base of said channel for receiving a portion of said rear axle housing, a plate welded at the top of said recess in said channel, gussets welded between the inner portion of said channel to said plate to provide a mounting for each of said upright columns.

7. A tractor having a narrow base protective frame as set forth in claim 1 including means on each of said upright columns for mounting a fender.

8. A tractor having a narrow base protective frame as set forth in claim 1 including means defining a cutout in the base of each of said upright columns, a base plate positioned adjacent said cutout of said upright column positioned at an angle to the longitudinal center of each of said upright columns for mounting said upright columns on said rear drive axle housings inclined to the rear of a vertical position.

9. A tractor having a narrow base protective frame as set forth in claim 1 including, means supporting at least two struts on said cross-member extending diagonally from said upright columns, means for mounting said struts on said rear drive assembly housing to thereby provide a triangular support of the lower portion of said uprights on said housings.

10. A tractor having a narrow base protective frame as set forth in claim 1 including means defining a horizontal surface on the top of said crossbeam and the top of said upright columns, a gusset extending forwardly from the top of each of said upright columns, a canopy mounted on the top of said upright columns in a cantilever manner.

* * * * *